United States Patent [19]

James

[11] Patent Number: 4,605,125
[45] Date of Patent: Aug. 12, 1986

[54] MINIATURE FLEXIBLE MAGNETIC DISK ASSEMBLY WITH MOTION LIMIT STOP

[75] Inventor: Richard N. James, 4911 Kenson Dr., San Jose, Calif. 95124

[73] Assignee: Dysan Corporation, Santa Clara, Calif.

[21] Appl. No.: 558,396

[22] Filed: Dec. 5, 1983

[51] Int. Cl.⁴ .................... G11B 23/02; B31B 1/14
[52] U.S. Cl. ................... 206/312; 206/444; 360/133; 493/58; 493/233; 493/240; 493/946
[58] Field of Search ............... 206/309, 311–313, 206/444; 360/97, 99, 133; 493/58, 233, 231, 240, 228, 946

[56] References Cited

U.S. PATENT DOCUMENTS

| | | | |
|---|---|---|---|
| 3,980,178 | 9/1976 | Schidlowski | 206/313 |
| 4,254,864 | 3/1981 | Mikura | 206/313 |
| 4,274,119 | 6/1981 | Hayward et al. | 360/133 |
| 4,413,298 | 11/1983 | Pecsok et al. | 206/313 |
| 4,433,410 | 2/1984 | Siryj et al. | 206/312 |
| 4,464,692 | 8/1984 | Yoshida et al. | 360/133 |
| 4,480,282 | 10/1984 | Brock et al. | 360/99 |
| 4,481,552 | 11/1984 | Dona et al. | 360/97 |

OTHER PUBLICATIONS

"Cartridge for Magnetic Disk", F. K. King and D. J. Wanek, *IBM Technical Disclosure Bulletin*, vol. 19, No. 7, Dec. 1976.

*Primary Examiner*—William Price
*Assistant Examiner*—Jimmy G. Foster
*Attorney, Agent, or Firm*—Townsend & Townsend

[57] ABSTRACT

A miniature flexible magnetic disk assembly having integrally formed motion limit stop projections along the length dimension of the disk assembly enclosure. The projections are formed from either side of the facing major wall portions of the enclosure by intruding a first and second pair of opposed major wall portion projections inwardly of the enclosure. Each projection has a concave outer surface, a convex inner surface and an abutment edge extending into the interior of the enclosure from each end of a progressive cut formed through the major wall portion a sufficient distance to provide an abutment edge forming an interference obstacle to the outer edge of the contained flexible disk.

16 Claims, 9 Drawing Figures

U.S. Patent  Aug. 12, 1986  4,605,125
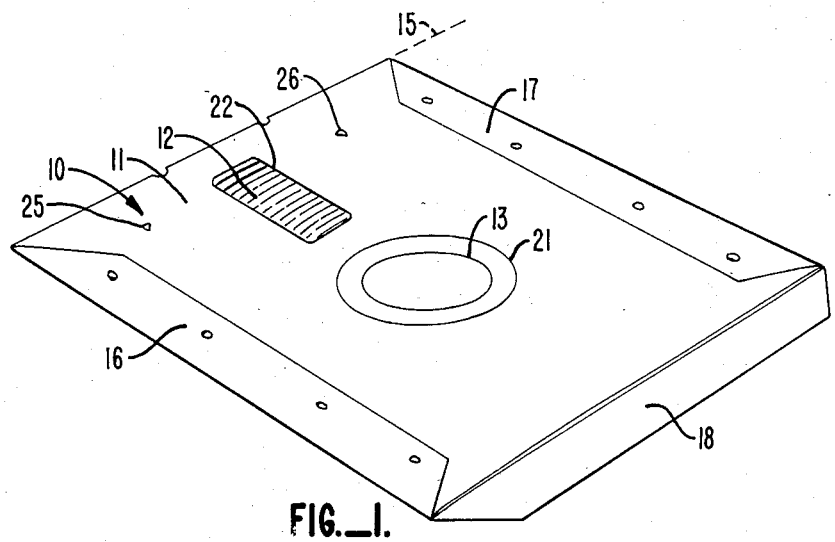
FIG._1.
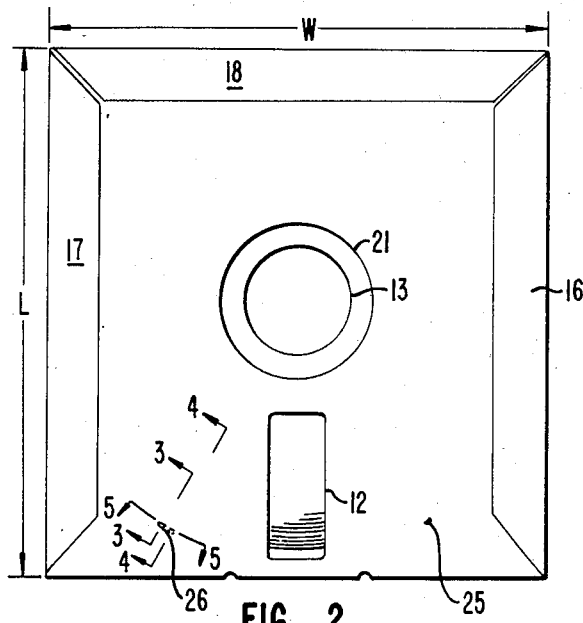
FIG._2.
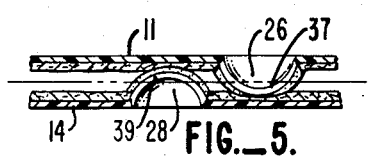
FIG._5.
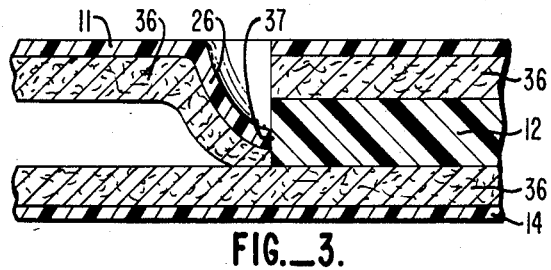
FIG._3.
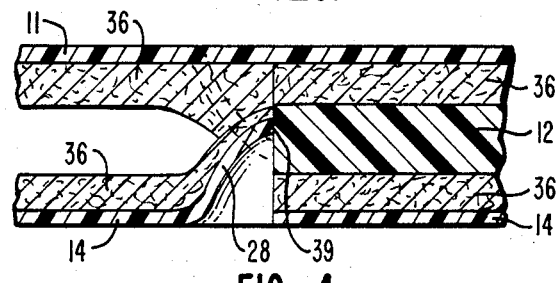
FIG._4.
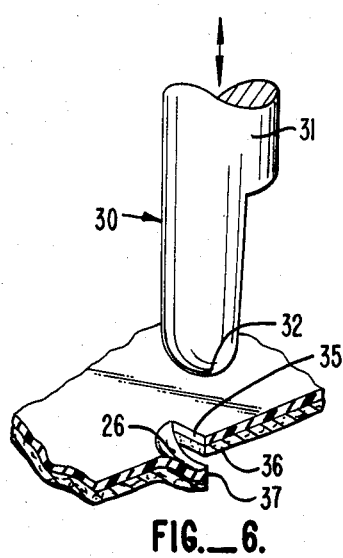
FIG._6.
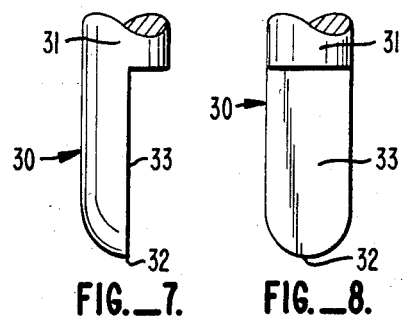
FIG._7.  FIG._8.
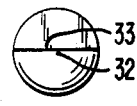
FIG._9.

MINIATURE FLEXIBLE MAGNETIC DISK ASSEMBLY WITH MOTION LIMIT STOP

BACKGROUND OF THE INVENTION

This invention relates to flexible magnetic recording disks, popularly known as "floppy disks", of the type used to magnetically store information.

Flexible disk recording media have become an established portable data recording and storage adjunct to a wide variety of computer systems due to the relatively low cost, small size and reliability of individual floppy disks, which affords convenience in storage and handling.

Although originally designed as an approximately 8" diameter flexible disk permanently enclosed in a durable yet pliant envelope with square geometry, recent trends in flexible disk technology have been toward smaller disks. As an example, the 5¼" flexible disk has recently achieved wide popularity for applications in home computers, personal computers, small business computers, and word processing computers.

The most recent trend in the technology of flexible disk media has been toward even smaller diameter disks, and one such disk is the currently emerging 3¼" diameter flexible recording disk, against which there are several competing sizes and designs. One design for a flexible recording disk of this size, generically termed a microfloppy disk, employs a thin flexible recording disk, typically fabricated from three mil Mylar encased in a pliant but durable envelope having an inner bonded liner material. This design closely resembles the original 8" flexible disk and the 5¼" flexible disk, with one important exception. Due to the relatively small dimensions of the microfloppy disk, and the associated disk drive apparatus, it has been found inconvenient to design the disk drive apparatus to accept a microfloppy disk having a rectangular envelope. Rather, due to the drive design characteristics, the envelope must be rectangular in its geometric configuration, thereby having a long axis and a short axis (the length and width dimensions, respectively). This is in contrast to larger flexible disk media assemblies in which the envelope is substantially square.

The use of the rectangular envelope for microfloppy disks creates a problem not encountered with larger sized flexible disks. More particularly, in the larger sized flexible disks having the square envelopes, the perimetral dimensions of the envelope can be chosen in such a manner that the flexible disk confined within the envelope is free to migrate laterally within the enclosure by an equal amount in all radial directions in the plane of the disk: this permits the relatively delicate thin disk to migrate laterally when necessary during insertion of the disk assembly into the associated drive in order to be captured by the hub and spindle clamp assembly, which rotates the disk within the envelope. The amount of radial migration is sufficient to ensure reliable capturing and centering of the flexible disk while still confining such lateral motion to a maximum amount which will not permit the central portion of the flexible disk to be so far off axis from the spindle-clamp assembly to be damaged during the clamping process.

In contrast, in rectangular microfloppy disk assemblies, the rectangular configuration permits substantially more migration of the flexible disk within the envelope in the length direction than in the width direction. Consequently, the flexible disk and metal hub assembly within the envelope is free to migrate to extreme positions along the length direction and are thus much more likely to be mismounted to the drive spindle during the loading process than conventional larger sized flexible disks with square envelopes, absent some mechanism for confining motion of the disk in the length direction. While efforts have been made to solve this problem not present in conventional larger sized flexible disks, the solutions adopted have not been entirely satisfactory. For example, in one such disk motion restricting design, the envelope is fabricated from a moulded plastic material having sufficient wall depth to provide an inner annular recess of preselected diameter forming the inner enclosed volume for the flexible disk. This design suffers from the disadvantages of relatively expensive initial tooling costs, relatively greater materials costs, and nonstandard appearance of the finished disk assembly (as compared to assemblies using the more traditional and conventional durable yet pliant envelope). Other attempts to modify the traditional flexible disk design to provide limit stops for the enclosed flexible disk along the length dimension or direction by adding discrete thin projections extending through the envelope have met with difficulties in providing good bonding with the envelope or jacket material, have added costly additional fabrication steps to the conventional manufacturing process, and have thus not met with wide success. Further attempts to provide the requisite flexible disk limit stop protection in the length direction by stamping projections into the envelope material itself have been altogether unsuccessful, due both to the presence of the inner liner material within the envelope enclosure and the extremely thin dimension of the flexible disk which, when combined with the relatively low friction (i.e., slippery) surface of the disk, facilitates migration of the edge of the disk past staggered opposed protrusions or "bumps" formed in the envelope or jacket surface.

SUMMARY OF THE INVENTION

The invention comprises an improved microfloppy disk, and a method for fabricating same, which minimizes or eliminates entirely the problem of unwanted longitudinal migration of the flexible disk within the envelope without requiring any supplemental or additional elements, and which can be implemented at exceedingly low cost as part of the standard fabrication process.

From an apparatus aspect, the invention comprises an enclosure for a flexible disk, the enclosure including facing major wall portions and sidewall portions defining an essentially bounded enclosure space for the flexible disk and motion limiting means formed in the facing major wall portions for limiting lateral migration of the disk within the enclosure space. The motion limiting means comprises a first spaced pair of inwardly extending projections formed in a first one of the facing major wall portions and a second spaced pair of inwardly extending projections formed in the other one of the facing major wall portions, the first and second pairs of projections being mutually spaced. The projections are preferably outer concave, and each terminates in a curved abutment edge within the enclosure space.

In the preferred embodiment, the enclosure is formed from a unitary blank having major wall portions formed by folding the blank in half, the sidewall portions being formed from folded back edge portions of the blank. A liner material is arranged within the enclosure space and bonded to the inner surfaces of the major wall portions by any suitable technique, e.g., multiple hot tacking, known as "pin bonding".

The enclosure is preferably rectangular, and the motion limiting means are positioned to limit lateral migration along the length dimension of the rectangular enclosure.

From a process standpoint, the invention comprises a method of fabricating an enclosure for a flexible recording disk, the method including the steps of providing an enclosure having facing major wall portions and sidewall portions defining an enclosure space for the disk, and forming motion limiting means in the facing major wall portions to provide lateral migration limiting stops for the disk. The step of providing includes the steps of providing a unitary enclosure blank, folding back a major portion of the blank to form the facing major wall portions, and folding opposed edge portions toward the center of the enclosure to form opposed sidewall portions. The step of forming includes the step of intruding a first and second pair of opposed major wall portion projections inwardly of the enclosure, preferably by forming a progressive cut through the major wall portions while inwardly deforming the adjacent major wall portion in the region of each projection. The step of intruding is preferably performed with a special tool having a half rounded tip terminating in a flat longitudinally extending shank. The step of forming the motion limiting means may be performed either prior to the step of providing an enclosure or after this step.

The method further includes the steps of inserting a flexible recording disk into the enclosure space either before or after the motion limiting projections have been formed in the facing major wall portions of the enclosure. After the disk has been encased in the enclosure, the enclosure is sealed.

The method further includes the step of arranging a liner in the enclosure space.

The invention affords the advantage of providing the requisite limited lateral migration of the flexible disk within the enclosure, without requiring the addition of any supplemental elements to provide this function. Further, the motion limiting projections can be formed in the enclosure major wall portions as an integral part of the conventional fabrication technique by simply adding an additional punching station to the assembly equipment, either prior to the insertion of the flexible disk within the enclosure or thereafter. Further the unique projections employed in the invention provide a highly effective means for limiting motion of the disk along the long axis of the enclosure which does not interfere with permitted motion but which presents a formidable barrier to impermissible transverse motion of the disk beyond the maximum permitted range.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a perspective view of a flexible disk assembly incorporating the invention prior to sealing of the enclosure;

FIG. 2 is a plan view of the top surface of the invention of FIG. 1;

FIGS. 3 and 4 are sectional views taken along lines 3—3 and 4—4 of FIG. 2, respectively;

FIG. 5 is a sectional view taken along lines 5—5 of FIG. 2;

FIG. 6 is a schematic view illustrating the manner in which the projections are formed;

FIG. 7 is a side elevational view of the end of the projection forming tool;

FIG. 8 is a front elevational view of the end of the tool of FIG. 7; and

FIG. 9 is an end elevational view of the working end of the tool of FIG. 7.

DESCRIPTION OF THE PREFERRED EMBODIMENTS

Turning now to the drawings, FIG. 1 illustrates a microfloppy disk assembly fabricated according to the invention. For simplicity, the conventional hub assembly normally used has been omitted from these Figs. An improved version of this hub assembly is disclosed in co-pendiing commonly assigned U.S. application Ser. No. 558,648, filed 12-6-83 for "Miniature Flexible Disc Assembly with Improved Hub Retainer" by Richard N. James, et.al., the disclosure of which is hereby incorporated by reference. As seen in this Fig., the assembly consists of an outer enclosure generally designated with reference numeral 10 having a top surface 11 forming one of the two major wall portions of the enclosure, and a flexible disk 12 received within the enclosure 10 and having a central aperture 13 dimensioned to accommodate a central hub assembly designed to be driven by the hub drive spindle of an associated disk drive apparatus (not illustrated). The enclosure 10 is preferably fabricated from a unitary blank folded in half about the parting line designated by reference numeral 15 to provide two facing major wall portions, the blank also having a pair of opposed edge portions 16, 17 folded over as shown to provide opposed edge wall portions. The blank further includes a sealing edge portion 18 illustrated in the unsealed position in FIG. 1 and illustrated in the sealed position in FIG. 2.

A central axis aperture 21 is formed through the facing major wall portions, either prior to the folding process or after the folding process and prior to insertion of the flexible disk 12 within the enclosure. Axis aperture 21 is provided to furnish access to the central annulus of the flexible disk 12 by the associated drive spindle when the disk assembly is inserted into the associated disk drive apparatus. A rectangular aperture is provided in each of the walls of enclosure 10 (with only aperture 22 in wall 11 being illustrated) to enable the read/write transducer carried by the associated disk drive apparatus to read and write data from and to both of the magnetic recording surfaces of flexible disk 12.

As best seen in FIG. 2, enclosure 10 is rectangular in configuration, having a length dimension L greater than width dimension W. The flexible disk 12 has a circular perimeter and the diameter of the disk 12 is less than the width dimension W by an amount which permits lateral migration of the disk 12 within the enclosure of a preselected amount. In the preferred embodiment, this value is in the range from 0.03 to 0.09 inch. The purpose for providing a width dimension W greater than the diameter of the disk 12 is to permit the disk central aperture 13 some freedom of movement within the plane of the disk so that the disk 12 will be properly grasped and mounted by the associated disk drive hub assembly when the disk assembly is inserted into the drive and also to provide running clearance between the outer diameter of the disk and the folded edge of the jacket enclosure 10. Stated differently, due to variations in the mechanical tolerances of the associated disk drive apparatus and also to account for variations in the operator handling procedures in inserting the disk assemblies, it is necessary that the disk 12 have some freedom of movement within the jacket 10 so that it may automatically be aligned with the disk drive hub during the process of mounting the disk to the hub. The width dimension W, however, cannot be so great as to permit too much lateral translation of the disk 12 within the jacket 10, since to do so would permit the central hub of the disk 12 to be radically misaligned to such an extent that the spindle/hub assembly of the associated disk drive would grossly misregister which would place the disk 12 in an out of round position with respect to the disk drive hub axis.

Ideally, the length dimension L would be equal to the width dimension W so that the range of permitted motion of the disk 12 in the jacket 10 would be uniform in orthogonal directions in the plane of the disk assembly. However, due to mechanical constraints imposed by the disk drive assembly, the length dimension must be greater than the width dimension so that an excessive amount of motion along the length dimension is possible. To prevent this excess motion, a plurality of motion limiting projections 25-28 are formed in the jacket 10 by means of the tool 30 illustrated in FIGS. 6-9. As seen in these Figs., tool 30 includes a rounded shank 31 terminating in a working end having a half rounded tip portion 32 and a flat longitudinally extending recessed shank 33. As illustrated for motion limiting projection 26 formed in major wall portion 11, each motion limiting projection is formed by impressing tip 32 of tool 30 against the outer surface of the major wall portion and forcing the wall portion material in contact towards the enclosure side of the major wall portion 11 to form a progressively cut 35 through the major wall portion and inwardly deform the adjacent major wall portion to form the projection 26 as shown having a concave outer surface and a convex inner surface with a curved abutment edge 37 extending therealong from each end of the cut or edge 35. Each wall portion must be backed up during this forming operation by a suitable hard die or an elastomer as commonly used in the tool industry. As illustrated in the FIGS. 3-5 for projections 26 and 28, a pair of projections is formed in each of the major wall portions: projections 25, 26 in top wall portion 11 and projections 27, 28 in the bottom major wall portion 14.

The top and bottom projections are staggered, preferably along a circular arc of radius equal to the maximum limit of permitted travel for the disk 12, so that an upper and lower projection are formed in mutual proximity as illustrated in FIG. 5 for projections 26, 28. As seen in this Fig., projection 26 is positioned to the immediate right of projection 28, and the innermost edges 37, 39 of each projection each extend toward the inner surface of the opposing major wall portion past the apex of the other to present a motion interference fit, obstacle or barrier to the outer edge of the flexible disk.

FIGS. 3 and 4 illustrate the manner in which the abutment edges of opposed projections 26 and 28 interfere with the lateral motion of disk 12 along length dimension L.

The disk assembly is manufactured according to the following steps. The unitary blank is first provided with a conventional liner material 41 preferably by "pin bonding" the liner material to the future inner surfaces of the blank. The blank is next folded about median line 15, and the edge flaps 16, 17 are folded back over. The projections 25-28 are next formed using a suitable fixture incorporating a plurality of tools 30, after which the flexible disk 12 is inserted into the interior of the jacket 10, followed by folding over of the edge flap 18. The edge flaps 16-18 are then pin bonded to the outer surface of major wall portion 11 to complete the assembly.

Alternatively, projections 25-28 may be performed in the enclosure 10 while still in the unitary blank stage. In this alternative, the individual tools 30 may be located along a single surface of the tool fixture which may facilitate this step in the fabrication procedure for some applications. Alternatively, projections 25-28 may be formed after the disk 12 has been inserted into the jacket 10, if desired.

A suitable material for the fabrication of jacket 10 is polyvinyl chloride. A suitable liner material is nonwoven polyester fabric. Other suitable material will occur to those skilled in the art.

As will now be apparent, microfloppy disk assemblies fabricated according to the teachings of the invention provide an effective motion limit stop for motion along the long axis of the disk assembly. Further, no additional materials are required to provide the motion limit stop feature: which maintains the cost of the disk assembly at a minimum. In addition, the order of formation of the projections 25-28 is quite flexible, so that the invention may be implemented in existing fabrication procedures with a minimum of manufacturing redesign.

While the above provides a full and complete disclosure of the invention, various modifications, alternate constructions and equivalents may be employed. For example, although the invention has been described with particular reference to a microfloppy flexible disk assembly, the invention may find application as well in flexible disks of other sizes. In addition, if desired, additional projections may be provided to afford a motion limit stop in other directions than the length dimension L. Therefore, the above disclosure should not be construed as limiting the scope of the invention, which is defined by the appended claims.

What is claimed is:

1. An enclosure for a flexible disk, said enclosure including facing major wall portions and sidewall portions defining an essentially bounded enclosure space for the disk, and motion limiting means formed in said facing major wall portions for limiting lateral migration of the disk within said enclosure space, said motion limiting means comprising a first spaced pair of inwardly extending projections formed in a first one of said facing major wall portions and a second spaced pair of inwardly extending projections formed in the other one of said facing major wall portions, said first and second pairs of projections being mutually spaced, said projections each having an outer concave surface and an inner convex surface, each said projection terminating in a curved abutment edge within said enclosure space.

2. The invention of claim 1 wherein said enclosure is formed from a unitary blank.

3. The invention of claim 2 wherein said sidewall portions are formed from folded back portions of said blank.

4. The invention of claim 1 further including liner material received within said enclosure space.

5. The invention of claim 4 wherein said liner material is bonded to the inner surfaces of said major wall portions.

6. The invention of claim 1 wherein said enclosure is rectangular and said motion limiting means are positioned to limit lateral migration along the length dimension of said rectangular enclosure.

7. A method of fabricating an enclosure for a flexible recording disk, said method comprising the steps of:
   (a) providing an enclosure having facing major wall portions and sidewall portions defined an enclosure space for the disk; and
   (b) forming motion limiting means in the facing major wall portions to provide lateral migration limiting stops for the disk, said step (b) of forming including the step of intruding from outside of said enclosure a first and second pair of opposed major wall portion projections inwardly of said enclosure, each said projection having an outer concave surface and an inner convex surface and terminating in a curved abutment edge within said enclosure.

8. The method of claim 7 wherein said step (a) includes the steps of (i) providing a unitary enclosure blank, (ii) folding back a major portion of the blank to form the facing major wall portions, and (iii) folding opposed edge portions toward the center of the enclosure to form opposed sidewall portions.

9. The method of claim 7 wherein said step of intruding includes the step of forming a progressive cut through the major wall portions while inwardly deforming the adjacent major wall portion in the region of each projection.

10. The method of claim 7 wherein said step of intruding is performed with a tool having a half rounded tip terminating in a flat longitudingly extending shank.

11. The method of claim 7 wherein said step (b) of forming is performed prior to said step (a) of providing.

12. The method of claim 7 further including the step (c) of inserting a flexible recording disk into said enclosure space.

13. The method of claim 12 wherein said step (c) is performed prior to said step (b).

14. The method of claim 12 further including the step (d) of sealing said enclosure.

15. The method of claim 7 further including the step of arranging a liner in said enclosure space.

16. A flexible disk enclosure fabricated according to the method of claim 7.

* * * * *

UNITED STATES PATENT AND TRADEMARK OFFICE
CERTIFICATE OF CORRECTION

PATENT NO. : 4,605,125

DATED : Aug. 12, 1986

INVENTOR(S) : Richard N. James

It is certified that error appears in the above-identified patent and that said Letters Patent is hereby corrected as shown below:

In column 1, line 38, cancel "rectangular" and insert --square--.

Signed and Sealed this

Twenty-third Day of December, 1986

*Attest:*

DONALD J. QUIGG

*Attesting Officer*   *Commissioner of Patents and Trademarks*